United States Patent
McNeel et al.

(10) Patent No.: US 9,451,047 B1
(45) Date of Patent: Sep. 20, 2016

(54) PERSONALIZED QUALITY OF SERVICE COMPARISON OF WIRELESS SERVICES

(71) Applicant: T-Mobile USA, Inc., Bellevue, WA (US)

(72) Inventors: Warren McNeel, Issaquah, WA (US); Matthew Davis, Bellevue, WA (US); Brian Ehrhart, Issaquah, WA (US); Brandon Shurick, Gig Harbor, WA (US)

(73) Assignee: T-Mobile U.S.A., Inc., Bellevue, WA (US)

( * ) Notice: Subject to any disclaimer, the term of this patent is extended or adjusted under 35 U.S.C. 154(b) by 0 days.

(21) Appl. No.: 14/664,780

(22) Filed: Mar. 20, 2015

(51) Int. Cl.
*H04M 3/42* (2006.01)
*H04L 29/08* (2006.01)
*H04W 4/02* (2009.01)
*H04L 12/26* (2006.01)
*H04W 4/14* (2009.01)

(52) U.S. Cl.
CPC .......... *H04L 67/322* (2013.01); *H04L 43/045* (2013.01); *H04L 43/06* (2013.01); *H04W 4/025* (2013.01); *H04W 4/14* (2013.01)

(58) Field of Classification Search
CPC ..... H04M 3/42; H04W 52/02; H04W 52/18; H04W 52/0209; H04W 4/02; H04W 48/18; H04W 88/06; G06F 9/5055; G06F 2209/5015; G06Q 10/06395; H04L 41/5022
USPC ............ 455/414.1, 422.1, 423, 419, 456.1, 455/456.5
See application file for complete search history.

(56) References Cited

U.S. PATENT DOCUMENTS

| | | | | |
|---|---|---|---|---|
| 2008/0065402 | A1* | 3/2008 | Sanamrad | G06F 9/5055 705/7.41 |
| 2009/0082009 | A1* | 3/2009 | Nagy | H04W 24/06 455/423 |
| 2012/0190353 | A1* | 7/2012 | Harwell | H04W 4/02 455/422.1 |
| 2013/0196685 | A1* | 8/2013 | Griff | H04L 43/067 455/456.1 |
| 2016/0088570 | A1* | 3/2016 | Cui | H04W 52/18 370/311 |

* cited by examiner

*Primary Examiner* — Shahriar Behnamian
(74) *Attorney, Agent, or Firm* — Han Santos Reich, PLLC

(57) ABSTRACT

Techniques described herein relate to generating personalized quality of service (QoS) comparison of wireless services. A user device may obtain first service data from a first wireless service using a user account and obtain second service data corresponding to the first service data from a second wireless service. The user has a benefit of a user account access to the first wireless service, and does not have a benefit of a user account access to the second wireless service. The user device may then generate a comparison between the first wireless service and the second wireless service based on the first service data and the second service data.

27 Claims, 9 Drawing Sheets

PERSONALIZED QUALITY OF SERVICE COMPARISON OF WIRELESS SERVICES

BACKGROUND

Mobile devices are often equipped with processors that may perform many tasks, such as running applications, recording data, playing media, and performing other tasks for users. Mobile devices include telecommunication devices, Wi-Fi devices, and other devices having connectivity to wireless networks. The wireless network are maintained and operated by mobile network operators. Since mobile network operators provide various features, plans, and user devices, it is challenging for mobile users to find appropriate and individual wireless services.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

A wireless service subscriber may want to switch from the subscriber's current service provider to a new service provider if the subscriber is dissatisfied with the quality of service (QoS) associated with the current wireless service. However, the subscriber may be unfamiliar with the QoS of the new wireless service. Implementations herein provides an application to allow a wireless service subscriber to compare the current wireless service with a new wireless service. The subscriber may download an application that is provided by the new wireless service and install the application on a user device of the subscriber. The application monitors the network usage of the subscriber on the current service over a predetermined time period, and provides QoS metrics including network coverage, speeds of data transmission, cost service, and/or signal strength. The application may provide details regarding QoS metrics of the new service for comparable network usage. In this way, the subscriber will have a personalized QoS comparison between the new wireless service and the current wireless service.

Illustrative Environment

Figure 1:
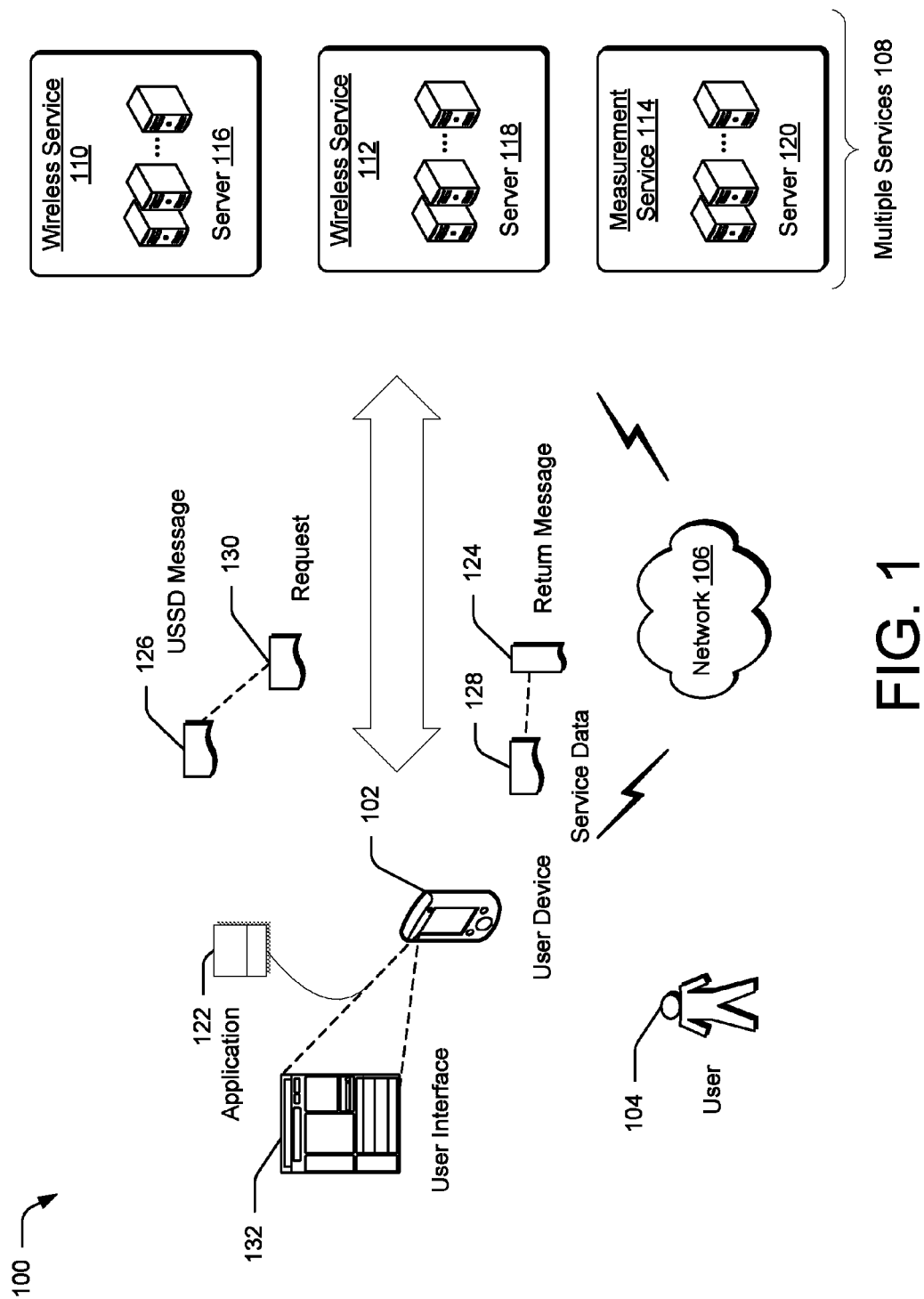
FIG. 1 is a diagram of an illustrative telecommunication environment that enables personalized quality of service (QoS) comparison of wireless services.

FIG. 1 is a diagram of an illustrative environment 100 that enables personalized QoS comparison of wireless services. The environment 100 includes a user device 102 associated with a user 104. The articles "a" and "an" are used herein to refer to one or to more than one (i.e. to at least one) of the grammatical object of the article. By way of example, "a user" means one user or more than one users. The user device 102 includes any type of device having a component for communicating with one or more other devices via one or more communication channels including, for example, wireless communication channels, such as infra-red, radio frequency (RF), optical, terrestrial, satellite communication media, and wired communication channels, such as copper wires, coaxial cables, Fiber-optic cables. Examples of the user device 102 may include mobile telephones/smartphones, netbooks, tablet computers, personal computers, data sticks, network adapters, and other electronic devices that may exchange signals with other devices, such as radio signals.

The user device 102 may exchange data with other computing devices through a network 106. The network 106 may include a plurality of hardware, software, and other infrastructure. The environment 100 shows an illustrative arrangement of the network 106. However, other arrangements may be used to facilitate transmission of data between the user device 102 and other computing devices.

The network 106 may include wired and/or wireless networks that enable communications between the various computing devices described in the environment 100. In some implementations, the network 106 may include local area networks (LANs), wide area networks (WAN), mobile telephone networks (MTNs), and other types of networks, possibly used in conjunction with one another, to facilitate communication between the various computing devices.

The computing environment 100 also includes multiple services 108, such as a wireless service 110, a wireless service 112, and/or a measurement service 114. An individual service of the multiple services 108 may be an entity providing hardware and software functionalities relevant to users, devices, applications, or to other services. For example, the wireless service 110 and the wireless service 112 provide wireless communication services to the user 104 using radio spectrum allocation, wireless network infrastructure, back haul infrastructure, billing, customer care, provisioning computer systems, access to the Internet, and/or access to other services.

In some implementations, the measurement service 114 may monitor wireless devices, and measure wireless network usage and/or wireless performance metrics of various wireless services, such as the wireless service 110 provided by a network operator and the wireless service 112 provided by another network operator. The measurement service 114 may analyze monitored and measured data, and provides information related to the analyzed data to the user device 102.

The user device 102 may exchange data with computing devices associated with the multiple services 108, such as a server 116 of the wireless service 110, a server 118 of the wireless service 112, and a server 120 that provides measurement service 114. In some implementations, the user device 102 may invoke an application 122 to transmit to the server 116 a request 130 for service data from the wireless service 110 using a user account associated with the user 104. The user may have user account access to a user account that enables the user to obtain service from the wireless service 110. The user account access may provide the user with access to the service data associated with the user account. For example, the user 104 has subscribed to a wireless service plan from the wireless service 110, and therefore has access to the service data associated with the user account. The service data may include fee information corresponding to a voice plan and/or a data plan that are associated with the user account from the wireless service 110. In some instances, the request 130 may include a message such as an unstructured supplementary service data (USSD) message 126. In response to the USSD message 126, the server 116 may transmit a return message 124 including service data 128 to the user device 102.

The user device 102 may obtain predicted service data from the wireless service 112. The user account does not have a benefit of a user account access to the wireless service 112. For example, the user 104 is not a subscriber to a wireless service plan provided by the wireless service 112, and therefore doesn't have access to any service data via a user account. However, the user device 102 is able to obtain the predicted service data from the wireless service 112 even without a subscription to the wireless service 112. The predicted service data is data generated by the wireless service 112 for comparison with the service data obtained from the wireless service 110. The predicted service data is generated for a virtual scenario in which the user device 102 is subscribing to service from the wireless service 112. For example, the predicted service data may include a voice plan having similar or the same plan parameters of the voice plan associated with the user account from the wireless service 110. The predicted service data may be for a data plan having similar or the same plan parameters of the data plan associated with the user account from the wireless service 110. The plan parameters may include a number of lines associated with a user account, an amount of wireless network data usage in a predetermined time period, and/or a number of voice plan minutes in a predetermined time period.

The user device 102 may generate a comparison between the wireless service 110 and the wireless service 112 based on the service data and the predicted service data. For example, the comparison may include a plan comparison, such as a cost comparison between two wireless service plans from the wireless service 110 and the wireless service 112 that have similar or the same parameters. The user device 102 may provide a report of the comparison in a user interface (UI) 132.

Illustrative Architectures

Figure 2:
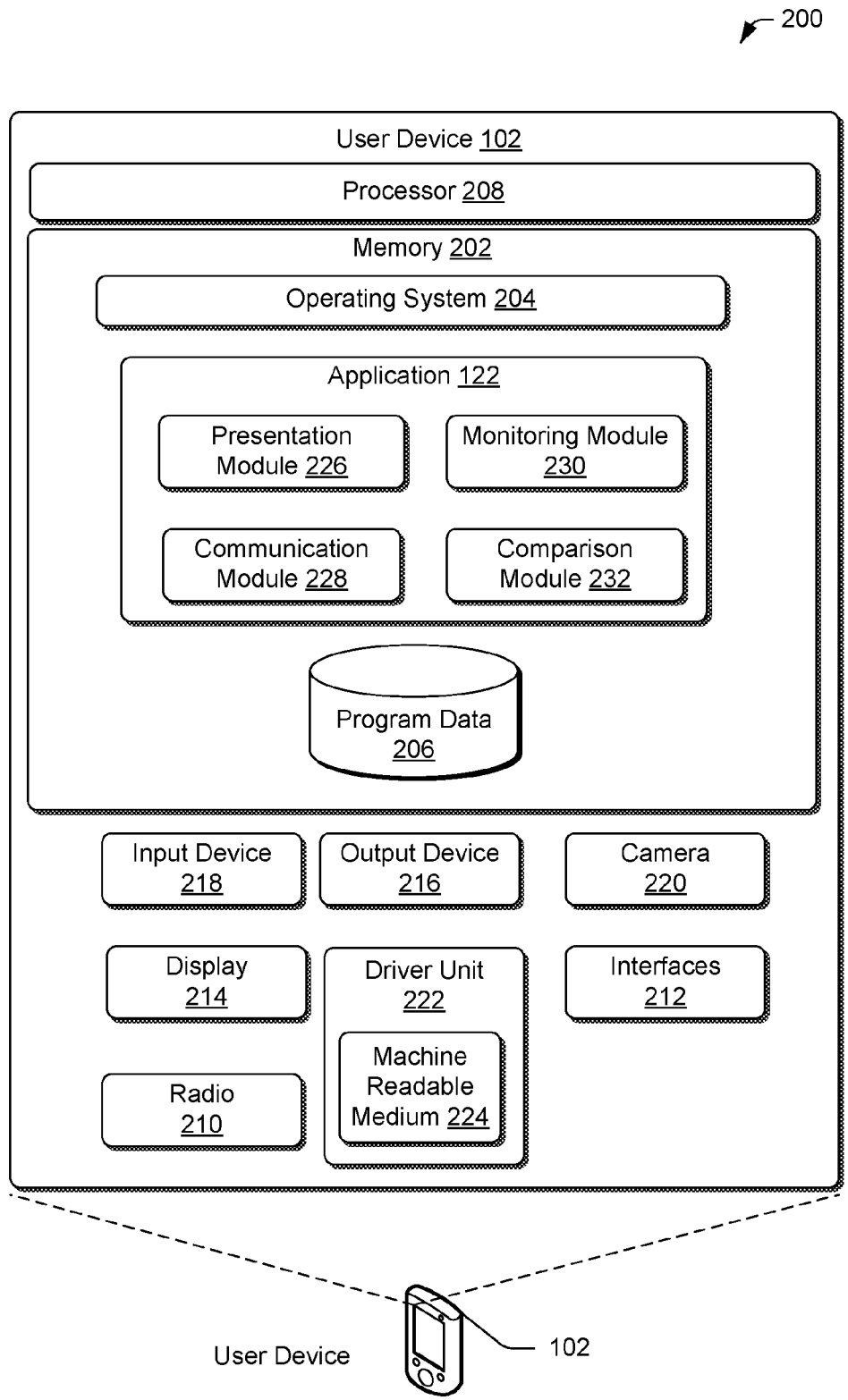
FIG. 2 is a schematic diagram of an illustrative computing architecture that generates personalized QoS comparison of wireless services.

FIG. 2 is a schematic diagram of an illustrative computing architecture 200 that generates personalized QoS comparison of wireless services. The computing architecture 200 shows additional details of at least one portion of the user device 102, which may include additional modules, kernels, data, and/or hardware.

In some implementations, the user device 102 may include a memory 202, the memory 202 storing an operating system (OS) 204, program data 206, and/or other component. The user device 102 may further include a processor 208, interfaces 212, a display 214, output devices 216, input devices 218, a camera 220, a radio 210, and drive unit 222, which may include a machine readable medium 224. In some implementations, the processor 208 is a central processing unit (CPU), a graphics processing unit (GPU), or both CPU and GPU, or other processing unit or component known in the art.

In various implementations, memory 202 generally includes both volatile memory and non-volatile memory. Such as RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium. Additionally, in some implementations, memory 202 includes a SIM (subscriber identity module) card, which is a removable memory card used to identify a user of the user device 102 to a service provider network.

Memory 202 may further be described as computer storage media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the user device 102. Any such computer storage media may be part of the user device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

In various implementations, the interfaces 212 may include various types of interfaces. For example, the interfaces 212 include any one or more of an Ethernet interface, wireless local area network (LAN) interface, a near field interface, a DECT chipset, or an interface for an RJ-11 or RJ-42 port. The a wireless LAN interface may include a Wi-Fi interface or a Wi-Max interface, or a Bluetooth interface that performs the function of transmitting and receiving wireless communications using, for example, the IEEE 802.11, 802.16 and/or 802.20 standards. For instance, the user device 102 may use a Wi-Fi interface to communicate directly with a nearby device. The near field interface may include a Bluetooth® interface or radio frequency identifier (RFID) for transmitting and receiving near field radio communications via a near field antenna. For example, the near field interface may be used for functions, as is known in the art, such as communicating directly with nearby devices that are further, for instance, Bluetooth® or RFID enabled. A reader/interrogator may be incorporated into user device 102.

In various implementations, the display 214 is a liquid crystal display or any other type of display commonly used in telecommunication devices. For example, display 214 may be a touch-sensitive display screen, and may then further act as an input device or keypad, such as for providing a soft-key keyboard, navigation buttons, or the like.

In some implementations, the output devices 216 include any type of output devices, such as the display 214, speakers, a vibrating mechanism, or a tactile feedback mechanism. The output devices 218 further include ports for one or more peripheral devices, such as headphones, peripheral speakers, or a peripheral display.

In various implementations, the input devices 218 include any type of input devices. For example, the input devices 218 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may further include a joystick-like controller and/or designated navigation buttons, or the like.

The machine readable medium 224 stores one or more sets of instructions, such as software, embodying any one or more of the methodologies or functions described herein. The instructions may further reside, completely or at least partially, within the memory 202 and within the processor 208 during execution thereof by the user device 102. Portions of the memory 202, as accessed by the processor 208, may further constitute machine readable media 224.

The memory 202 also store the application 122, which may include various components, such as a presentation module 226, a communication module 228, a monitoring module 230, and/or a comparison module 232. The communication module 228 may obtaining service data from the wireless service 110 using a user account associated with the user 104, and the user account has a benefit of user level access to the wireless service 110.

In some implementations, the communication module 228 may transmit the USSD message 126 to the server 116 using the user account. The communication module 228 may receive the return message 124 in response to the USSD message 126 from the server 116. The communication module 228 may then retrieve the service data associated with the user account from the return message. The return message 124 may include billing information and/or upgrade information associated with the user account. The billing information may include cost information corresponding to a voice and/or data plan associated with the user account with respect to the wireless service 110. For example, the billing information includes monthly fees for a voice plan and/or data plan associated with the user account. The upgrade information may include a time period for the user 104 to upgrade the user device or a wireless plan associated with the user account with respect to the wireless service 110. For example, if the user 104 switches from the wireless service 110 to another wireless service, such as the wireless service 112, the application 122 may determine earlier termination fees based on the time period using a predefined formula.

The communication module 228 may obtain predicted service data from the wireless service 112, and the predicted service data being for wireless service that is comparable to the service data obtained from the wireless service 110. The user account does not have a benefit of user level access to the wireless service 112. For example, the user 104 lacks a subscription to a wireless service plan from the wireless service 112. In some implementations, the monitoring module 230 may retrieve plan parameters from the service data. The plan parameters may include a number of lines associated with a user account, an amount of wireless network data usage in a predetermined time period, and/or a number of voice plan minutes in a predetermined time period.

The communication module 228 may transmit the request 130 for the predicted service data from the wireless service 112, and the request may include plan parameters for the retrieval of information. Based on the retrieval plan parameters, the server 118 of the wireless service 112 may provide the predicted service data that corresponds to the service data from the wireless service 110. The server 118 may then transmit the return message 124 including the predicted service data to the user device 102.

The comparison module 232 may generate a comparison between the wireless service 110 and the wireless service 112 based on the service data and the predicted service data. The presentation module 226 may present a report of the comparison to the user 104 in the UI 132 of the user device 102. For example, the report may include a current monthly cost for the user account from the wireless service 110 and a determined monthly cost from the wireless service 112.

In some implementations, the comparison module 232 may generate a personalized wireless plan associated with the wireless service 112 for the user 104 based on the service data and the predicted service data. The personalized wireless plan may include cost information of a voice plan and a data plan, and feature information of the voice plan and the data plan. The feature information may include an amount of data usage in a predetermined time period, a time that night hours begin, minutes of free night and weekend, and/or a multiple user plan or family plan.

In some implementations, the monitoring module 230 may monitor performance of the user device 102 and measure wireless performance metrics of wireless communications in that the user device 102 engages. For example, the monitoring module 230 may analyze the user device 102 based on a predetermined parameter, such as a size of memory, a CPU speed, a type of an operating system, a use device type, a feature of wireless communications, a use device cost, a type of media provided in the user device 102, a size of media provided in the user device 102, and a mobile application resident on the user device 102. The monitoring module 230 may select another user device matching the user device based on the predetermined parameter. The presentation module 226 may provide a recommendation of the other user device to the user 104.

In some implementations, the presentation module 226 may generate a graphical representation of comparisons. For example, the graphic representation may indicate one or more comparisons on two overlaid coverage maps, which is also discussed in FIG. 5.

In some implementations, the monitoring module 230 may determine a QoS metric of the wireless service 110 and the wireless service 112 at a location. The comparison module 232 may generate an additional comparison between the wireless service 110 and the wireless service 112 based on the QoS metric. For example, the location may be represented by a physical address. The location may indicate an area that the user 104 visits in a predetermined time period. In some instances, the user 102 may visit the location with a frequency greater than a predetermined value. In some implementations, the location may indicate an area with heavy network data usage. For example, the network data usage used in the location is greater than a predetermined value or a predefined condition, such as a certain percentage of network data usage in a predefined time period.

The QoS metric may include information of at least one of network coverage associated with the wireless service 110 and the wireless service 112, data transmission rates associated with the wireless service 110 and the wireless service 112, or signal strength associated with the wireless service 110 and the wireless service 112. For example, the information regarding network coverage may include measurement of general coverage, urban coverage, rural coverage, network coverage of a predefined location, and/or reliability of network that are associated with the wireless service 110 and the wireless service 112. The information regarding data transmission speeds may include data transmission speeds in general coverage, speeds in the third generation (3G) coverage, speeds in fourth generation (4G) coverage, speeds in a predefined location, speeds of downloading/uploading under 3G, and/or speeds of downloading/uploading under 4G.

The application 122 may obtain the information regarding the location using various methods. For example, the monitoring module 230 may obtain data about wireless communications in which the user device 102 is engaged in using the wireless service 110. The monitoring module 230 may then retrieve location information from the obtained data, which may include geographic information of the user 104 or the user device 102 in a predetermined time period. In some implementations, the monitoring module 230 may monitor wireless data usage consumed by the user device 102 in a predetermined time period via the wireless service 110, and determine the location in which an amount of wireless data usage is greater than a predetermined value.

In some implementations, the monitoring module 230 may retrieve the geographic information from data, such as data of photos taken by and/or stored in the user device 102. For example, the user device 102 may include a Global Positioning System (GPS) connected with the camera 220. When the camera 220 takes a photo, location information, such as GPS coordinates, may be stored and associated with the taken photo. The monitoring module 230 may then retrieve the location information from the photo.

In some implementations, the communication module 228 may receive measurement data of QoS metrics from the multiple services 108, such as the measurement service 114. In some instances, the measurement data may include data related to network coverage of one or more wireless services, data transmission speeds of the one or more wireless services, and/or signal strength of the one or more wireless services.

In some implementations, the comparison module 232 may generate, based on the comparisons, a recommendation that the user 104 switches from the wireless service 110 to another wireless service, such as the wireless service 112. The presentation module 226 may present the recommendation to the user 104, and provide transferring information in response to a determination that the user 104 accepts the recommendation. For example, the transferring information may include at least one of a coupon associated with the transferring, information of one or more local stores associated with the wireless service 112, or a temporary account associated with the wireless service 112 for the user 104.

The presentation module 226 may provide a survey to the user 104, and receive user information input by the user 104. The information may include the service data 128 of the wireless service 110, and at least a portion of the data of wireless communications including location information. The location information may indicate relationship between the location and the user 104, such as a home, an office, and/or a workplace. The location information may also indicate a type of the location, such as building, underground, domestically areas, and/or international areas.

The presentation module 226 may also present information on terms of service associated with the application 122. The information on the terms of service includes what data the application 122 may retrieve to generate personalized comparison of a plurality of wireless services, and how the data will be handled by the application 122 and other computing devices. For example, the information of terms of service may indicate that the application 122 may not collect, store or share the data without consent of the user 104. When the user 104 uninstall the application 122 from the user device 1012, the data will be deleted. The presentation module 226 may present the information when the user 104 installs and/or launches the application 122. If the user 104 does not agree with the terms of service, the function of personalized comparison of wireless services will be disabled from the application 122. In some implementations, upon consent of the user 104, the application 122 may transmit anonymous data to the multiple services 108 for further analysis to improve QoS of wireless communications.

FIGS. 3-6 are illustrative examples of UIs that enable personalized QoS comparison of wireless services. While FIGS. 3-6 illustrate four examples of UIs, it is to be appreciated that multiple other graphical or non-graphical UIs may be employed to enable personalized QoS comparison of wireless services using an application. The UIs may be presented by the application 122, and displayed by the user device 102.

Figure 3:
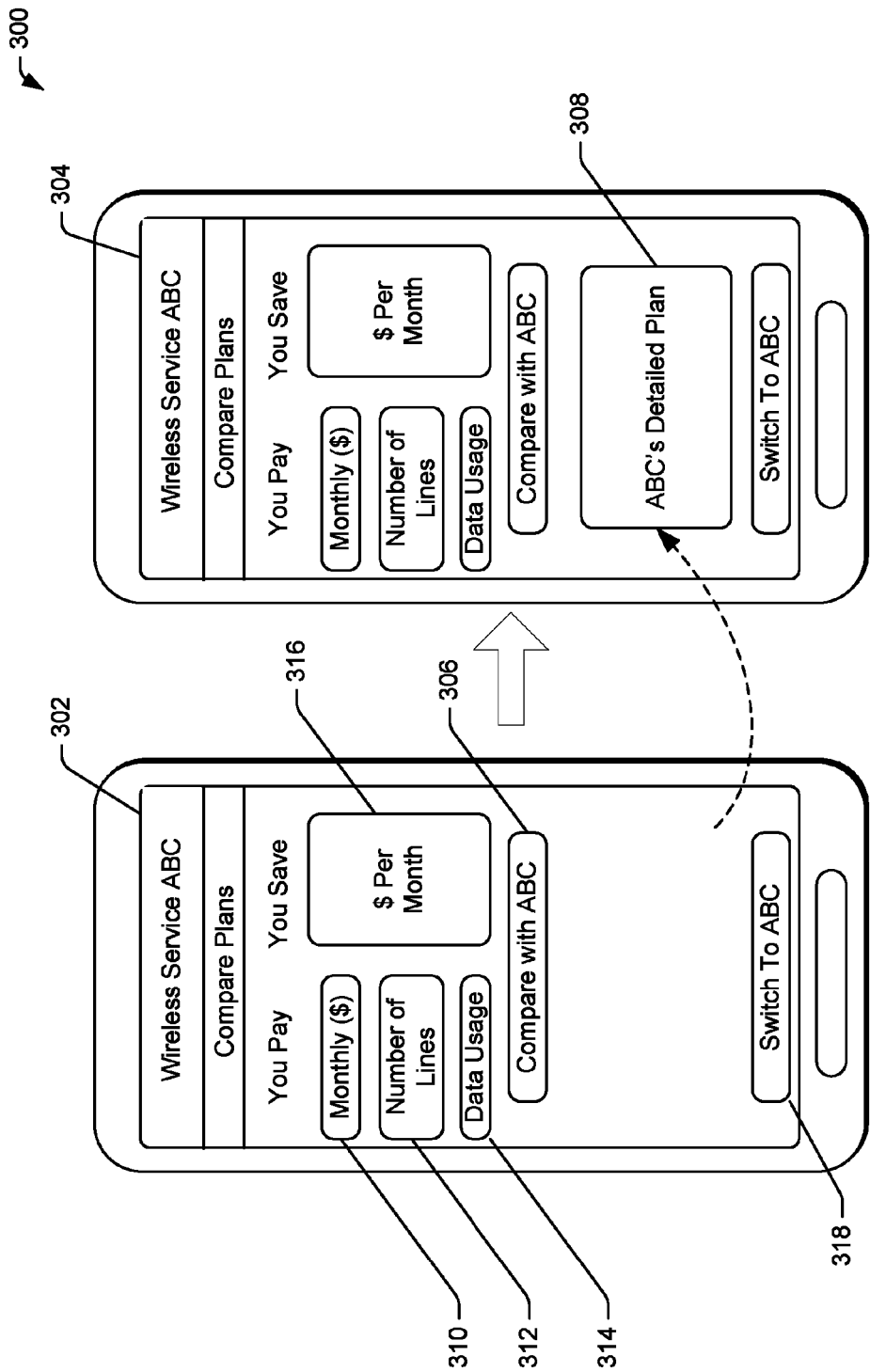
FIG. 3 is an illustrative user interface (UI) that enables personalized QoS comparison of wireless services.

FIG. 3 illustrates an example 300 where the user device 102 toggles between displaying a UI 302 and displaying a UI 304 in response to the user 104 selecting a button 306. When the user 104 select the button 306, the user device 102 may generate a comparison between the wireless service 110 and the wireless service 112, as well as present a report associated with the comparison in a section 308. For example, the section 308 may include a detailed plan from the wireless service 112 that corresponds to the currently plan associated with the user account from the wireless service 110. The UI 302 may include a section 310 illustrating a monthly cost of the currently plan associated with the user account from the wireless service 110. The UI 302 may also include a section 312 illustrating a number of lines associated with the user account from the wireless service 110. The UI 302 may also include a section 314 illustrating the size of current data usage associated with the user account from the wireless service 110.

In some implementations, the user device 102 may obtain, from the multiple services 108, the Information and surface the information in the section 310, the section 312, and the section 314, respectively. In other implementations, the user device 102 may obtain the information from the user 104. In some implementations, the UI 302 may also include a section 316 illustrating an amount of money saved by the user 104 if the user 104 switches from the wireless plan provided by the wireless service 110 to a wireless plan provided the wireless service 112.

The user device 102 may display another UI in response to the user 104 selecting a button 318. The other UI may enable the user 104 to switch from a wireless plan provided by wireless service 110 to a wireless plan offered by the wireless service 112. For example, the other UI may surface transferring information including a coupon associated with the transferring, information of one or more local stores associated with the wireless service 112, and/or a provisional account associated with the wireless service 112 for the user.

Figure 4:
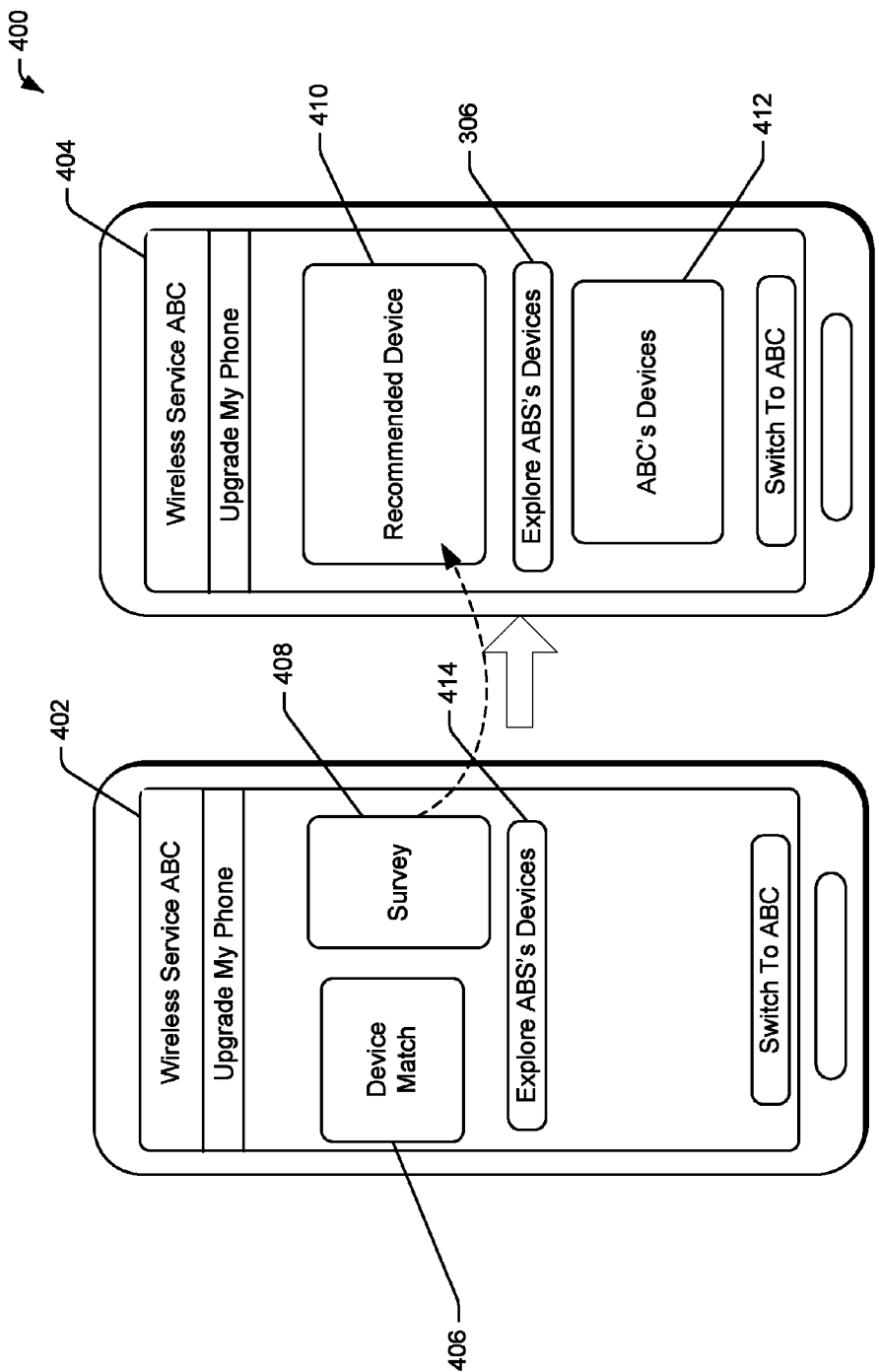
FIG. 4 is another UI that enables personalized QoS comparison of wireless services.

FIG. 4 illustrates an example 400 where the user device 102 toggles between displaying a UI 402 and displaying a UI 404 in response to the user 104 selecting a button 406 or a button 408. When the user 104 selects the button 406, the user device 102 may analyze the user device 102 using one or more predetermined parameters, and select a user device matching the user device 102. When the user 104 select the button 408, the user device 102 may receive device information input by the user 104, and then select a user device based on the device information. The user device 102 may present information of the selected user device in a section 410. In some implementations, the user device 102 may display information on various user devices in a section 412 when the user 104 select a button 414.

Figure 5:
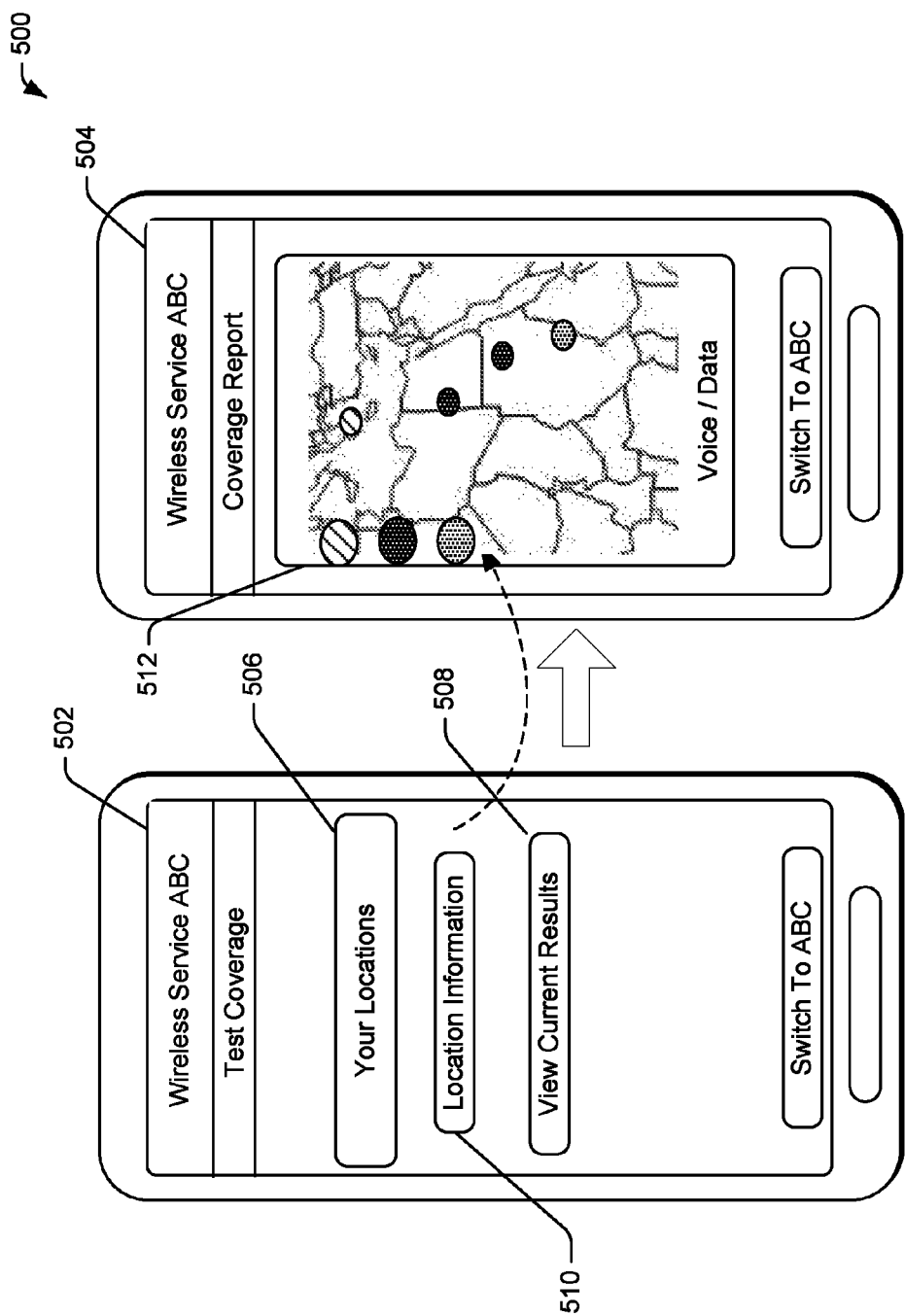
FIG. 5 is yet another UI that enables personalized QoS comparison of wireless services.

FIG. 5 illustrates an example 500 where the user device 102 toggles between displaying a UI 502 and displaying a UI 504 in response to the user 104 selecting a button 506 and/or a button 508. When the user 104 selects the button 506, the user device 102 may obtain information regarding a location associated with the wireless communications in that the user device 102 engages, and display the information of the location in a section 510. In some implementations, the user device 102 may provide a survey to the user 104 to ask the user 104 to enter current location information. The user device 102 may retrieve the information regarding the location using a current location of the user device 102 and/or using photos stored in the user device 102.

When the user 104 selects the button 508, the user device 102 may display a coverage report in a section 512. For example, the user device 102 may generate and present a graphical representation indicating one or more comparisons between the wireless service 110 and the wireless service 112 on two overlaid coverage maps.

Figure 6:
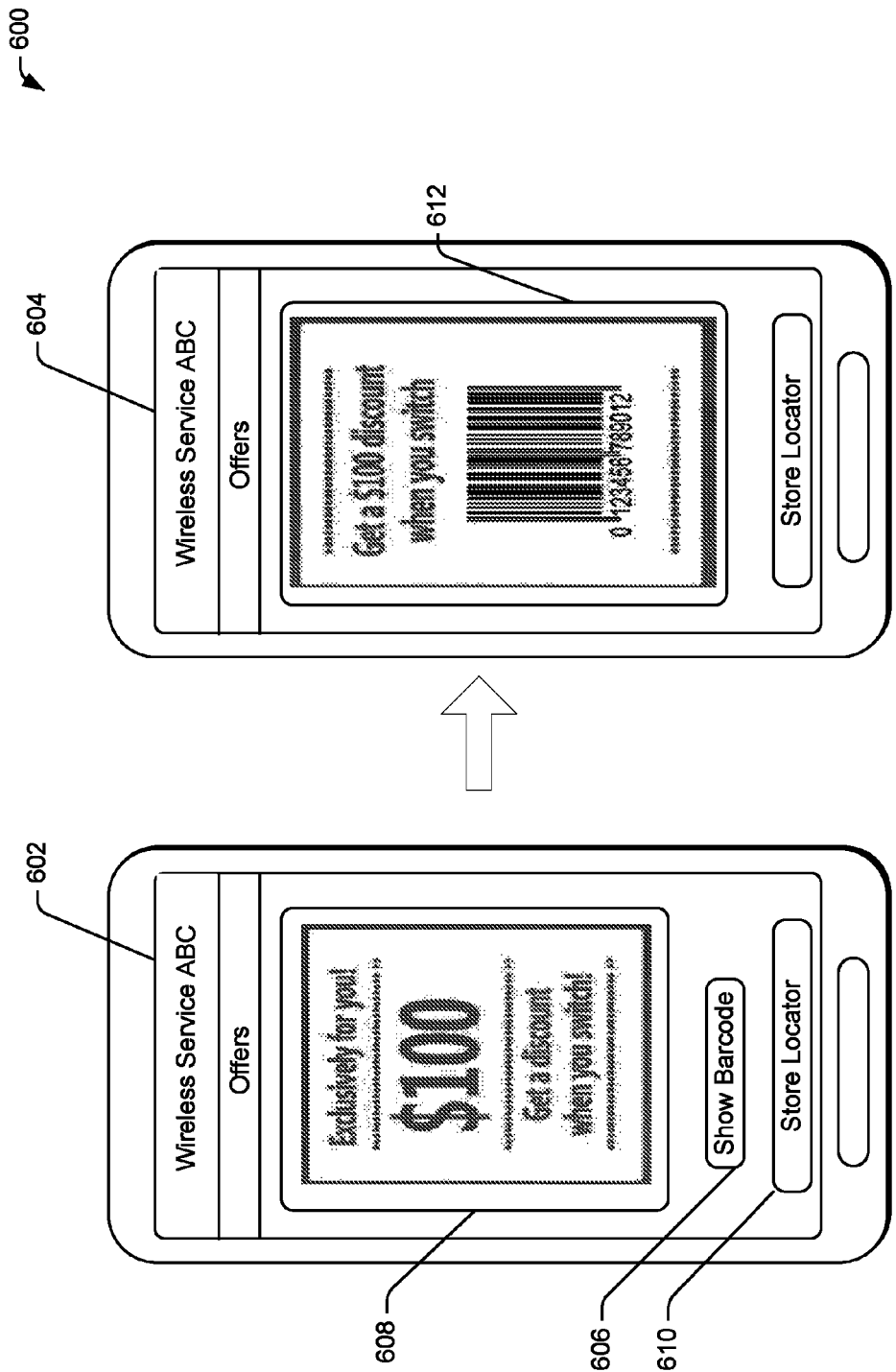
FIG. 6 is yet another UI that enables personalized QoS comparison of wireless services.

FIG. 6 illustrates an example 600 where the user device 102 toggles between displaying a UI 602 and displaying a UI 604 in response to the user 104 selecting a button 606. When the user 104 agrees to switch from a wireless plan provided by the wireless service 110 to a wireless plan provided by the wireless service 112, the user device 102 may display a coupon associated with the switching. When the user 104 selects a button 610, the user device 102 may select a retail store of the wireless service 112 based on a current location of the user device 102 or location information provided by the user 104. The user device 102 may then present information about the selected retail store to the user 104. When the user 104 select the button 606, the user device 102 may display a graphic representation associated with the coupon in a section 612.

Figure 7:
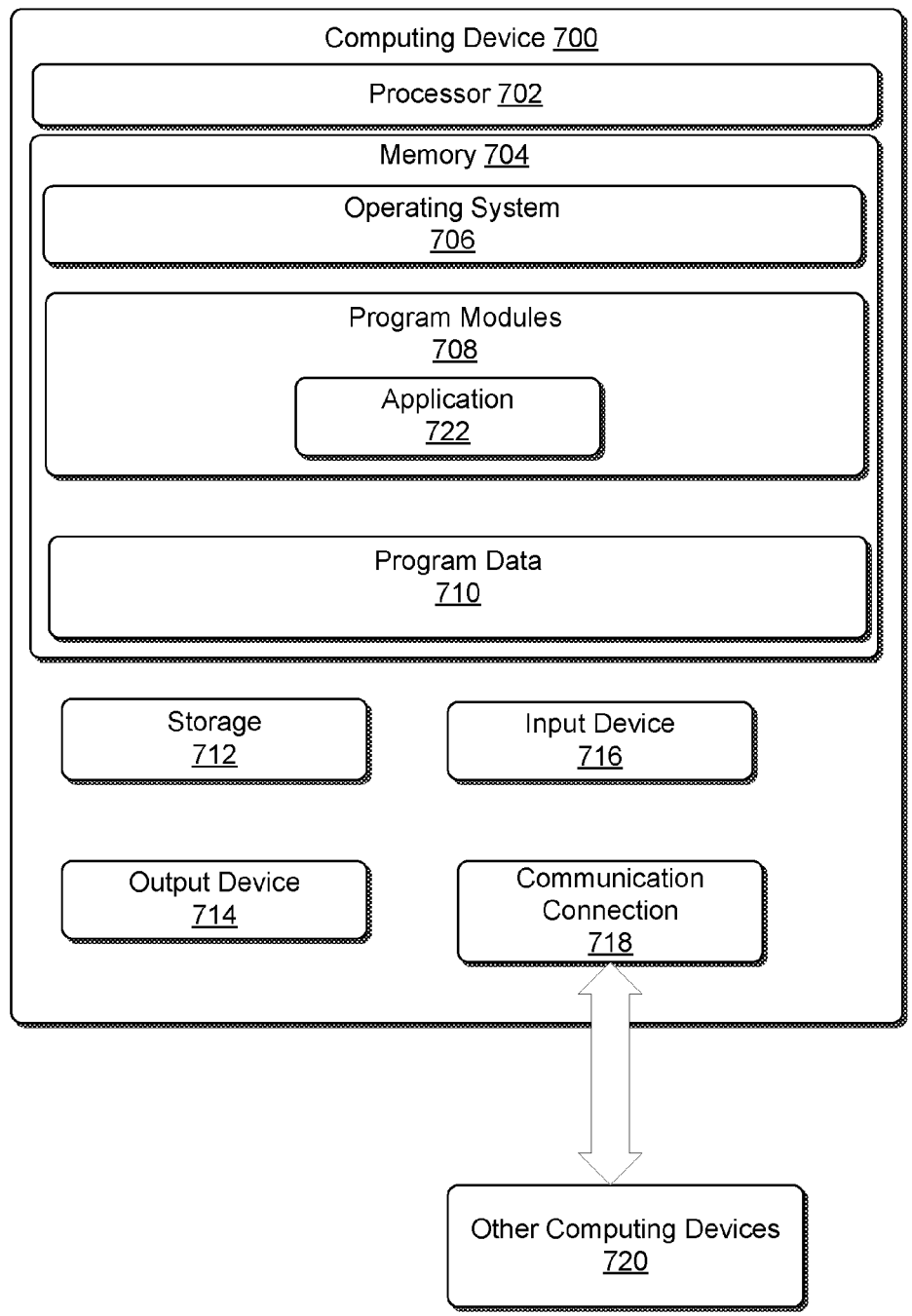
FIG. 7 is a schematic diagram of an illustrative computing architecture that facilitates personalized QoS comparison of wireless services.

FIG. 7 is a schematic diagram of an illustrative computing architecture of a computing device 700 that facilitates personalized QoS comparison of wireless services. The computing device 700 shows additional details of at least one portion of the server 116, the server 118, or the server 120, which may include additional modules, kernels, data, and/or hardware.

In various implementations, the computing device 700 may include at least one processing unit 702 and system memory 704. Depending on the exact configuration and type of computing device, system memory 704 may be volatile, such as RAM, non-volatile, such as ROM, flash memory, or some combination of the two. The system memory 704 may store an operating system 706, one or more program modules 708, and may include program data 710.

The computing device 700 may further include additional data storage devices (removable and/or non-removable) such as, for example, magnetic disks, optical disks, or tape. Such additional storage is illustrated in FIG. 7 by storage 712. Computer storage media may include volatile and nonvolatile, removable and non-removable media implemented in any method or technology for storage of information, such as computer readable instructions, data structures, program modules, or other data. The system memory 704 and storage 712 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 700. Any such computer-readable storage media may be part of the computing device 700.

In various implementation, any or all of the system memory 704 and the storage 712 may store programming instructions which, when executed, implement some or all of the above-described operations of the computing device 700 or other components described in the environment 100 shown in FIG. 1.

The computing device 700 may further have input device(s) 714, such as a keyboard, a mouse, a touch-sensitive display, voice input device. Output device(s) 716, such as a display, speakers, and a printer may further be included. The computing device 700 may further contain communication connections 718 that allow the device to communicate with other computing devices 720. In various implementations, the computing device 700 may be configured to manage, for example, wireless communication services or measurement services. For example, the program modules 708 may include an application 722 configured to receive and process the request 130, and then generate the service data 128 and transmit the service data 128 to the user device 102.

Illustrative Processes

Figure 8:
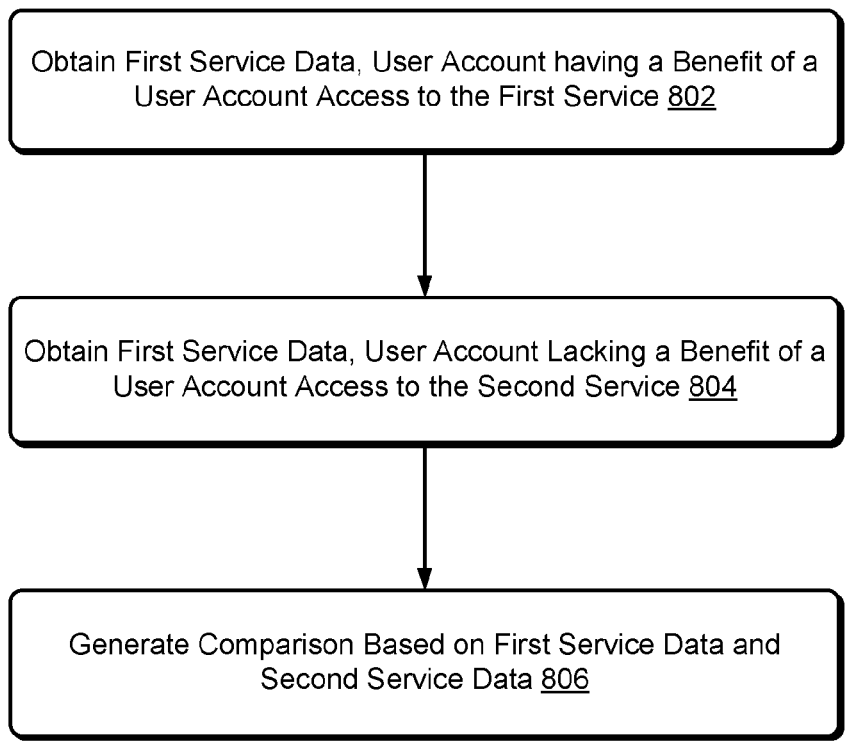
FIG. 8 is a flow diagram of an illustrative process for generating personalized QoS comparison of wireless services.
Figure 9:
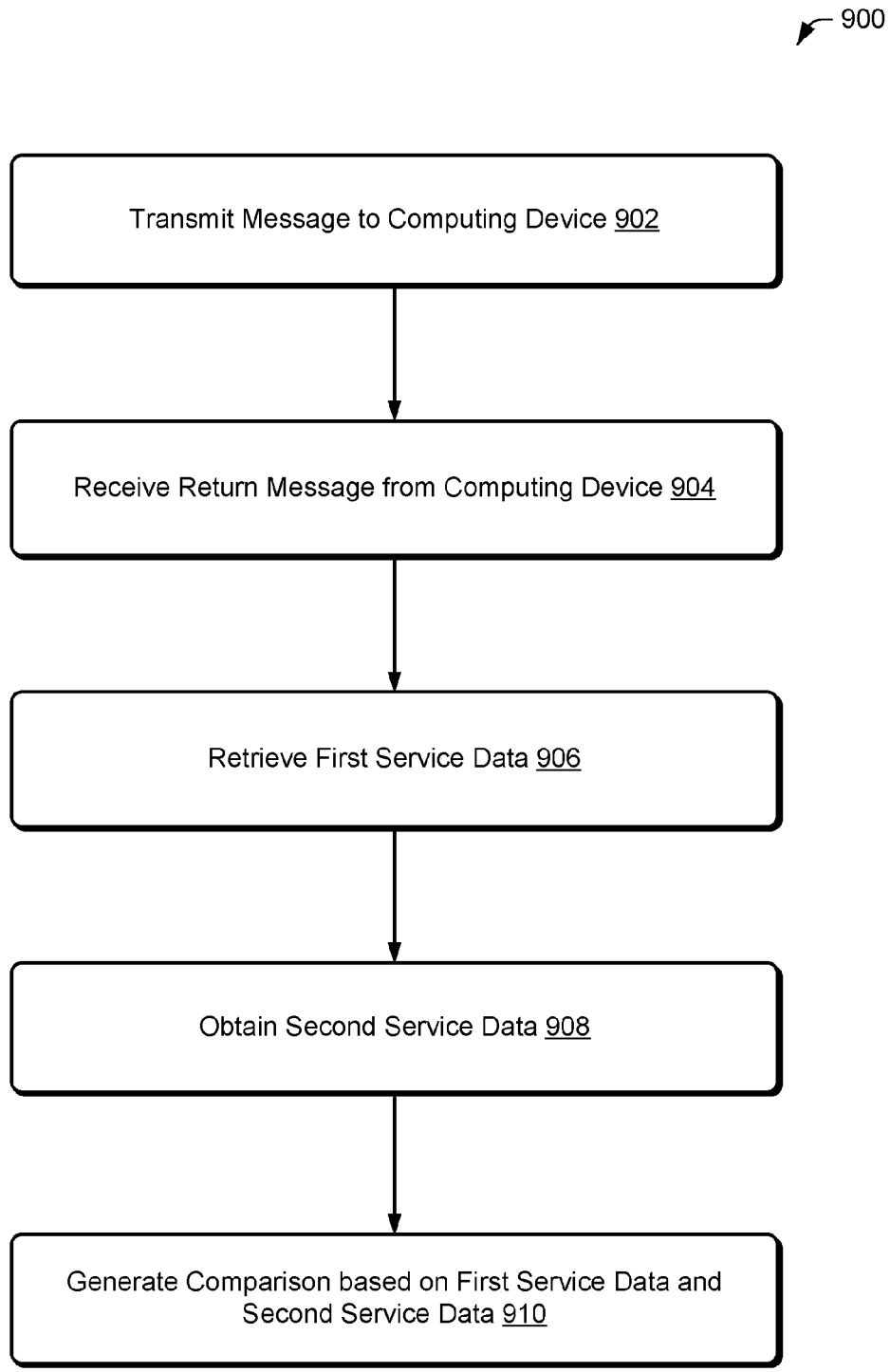
FIG. 9 is another flow diagram of an illustrative process for generating personalized QoS comparison of wireless services.

FIG. 8 and FIG. 9 present illustrative processes 800 and 900 for adjusting a quality level of media streaming based on changes in network communication quality. Each of the processes 800 and 900 is illustrated as a collection of blocks in a logical flow graph, which represent a sequence of operations that may be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process.

FIG. 8 is a flow diagram of an illustrative process 800 for generating personalized QoS comparison of wireless services. The process 800 is described with reference to the computing environment 100, as well as the computing architectures 200 and 700. However, the process 800 may be implemented in other environments, and/or computing architecture.

At 802, one or more processors of the user device 102 may obtaining first service data from the wireless service 110 using a user account associated with the user 104. The user account has a benefit of a user account access to the wireless service 110. The first service data may include fee information of a voice and/or data plan associated with the user account from the wireless service 110.

In some implementations, the one or more processors may transmitting a USSD message to the server 116 using the user account, and receive the return message 124 in response to the USSD message 126 from the server 116. The one or more processors may then retrieve the first service data from the return message 124.

At 804, the one or more processors may obtain second service data corresponding to the first service data from the wireless service 112. The user account does not have a benefit of a user account access to the wireless service 112. For example, the user 104 does not subscribe the wireless service 112.

The second service data may include fee information of a voice and/or data plan corresponding to the first service data. For example, the second service data may include a voice plan having similar or the same parameters of the voice plan associated with the user account from the wireless service 110. The second service data may also include a data plan having similar or the same parameters of the data plan associated with the user account from the wireless service 110. The parameters may include a number of lines associated with a user account, an amount of wireless network data usage in a predetermined time period, and/or a number of voice plan minutes.

At 806, the one or more processors may generating a comparison between the wireless service 110 and the wireless service 112 based on the first service data and the second service data. In some implementations, the comparison may include a QoS comparison between the wireless service 110 and the wireless service 112 based on the one or more QoS metrics at a location. For example, the location indicates an area that the user 104 visits in a predetermined time period.

In some implementations, the one or more QoS metrics may include at least one of network coverage associated with the wireless service 110 and the wireless service 112, data transmission rates associated with the wireless service 110 and the wireless service 112, or signal strength associated with the wireless service 110 and the wireless service 112 in the location.

FIG. 9 is another flow diagram of an illustrative process 900 for generating personalized QoS comparison of wireless services. The process 900 is described with reference to the computing environment 100 and the computing architectures 200 as well as 700. However, the process 900 may be implemented in other environments, and/or computing architecture.

At 902, one or more processors of the user device 102 may transmit a USSD message to the server 116 using a user account associated with the wireless service 110. The user account has a benefit of a user account access to the wireless service 110.

At 904, the one or more processors may receive the return message 124 in response to the USSD message 126 from the server 116.

At 906, the one or more processors may then retrieve the first service data from the return message 124. The first service data may include fee information of a voice and/or data plan associated with the user account from the wireless service 110.

At 908, the one or more processors may obtain second service data corresponding to the first service data from the wireless service 112. The user account does not have a benefit of a user account access to the wireless service 112. The second service data may include fee information of a voice and/or data plan corresponding to the first service data.

At 910, the one or more processors may generating a comparison between the wireless service 110 and the wireless service 112 based on the first service data and the second service data. In some implementations, the comparison may include a QoS comparison between the wireless service 110 and the wireless service 112 based on the one or more QoS metrics at a location.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for operating a user device, the method comprising:
   transmitting, by one or more processors of the user device, a message to a computing device associated with a first wireless service using a user account that has a benefit of a user account access to the first wireless service;
   receiving, by the one or more processors, a return message in response to the message from the computing device;
   retrieving, by the one or more processors, first service data associated with the user account based on the return message;
   obtaining, by the one or more processors, second service data corresponding to the first service data from a second wireless service, the user account lacking a benefit of a user account access to the second wireless service; and
   generating, by the one or more processors, a comparison between the first wireless service and the second wireless service using the first service data and the second service data.

2. The method of claim 1, wherein the message includes an unstructured supplementary service data (USSD) message.

3. The method of claim 1, wherein the first service data comprises fee information corresponding to a voice plan associated with the user account from the first wireless service or a data plan associated with the user account from the first wireless service, or a combination thereof.

4. The method of claim 1, further comprising:
   analyzing the user device using one or more predetermined parameters;
   selecting an additional user device matching the user device; and
   providing a recommendation of the additional user device to a user associated with the user account.

5. The method of claim 1, further comprising:
   determining one or more quality of service (QoS) metrics of the first wireless service and the second wireless service at a location; and
   generating an additional comparison between the first wireless service and the second wireless service based on the one or more QoS metrics.

6. The method of claim 5, wherein the location indicate an area that a user associated with the user account visits in a predetermined time period, and wherein a frequency of visits to the area is greater than a predetermined value.

7. The method of claim 5, further comprising:
   obtaining data of wireless communications engaged by the user device using the first wireless service; and
   retrieving information of the location from the data of wireless communications.

8. The method of claim 7, wherein the data of wireless communications comprises geographic information associated with a user of the user account or the user device in a predetermined time period, wherein the retrieving the information of the location from the data of wireless communications comprises retrieving the information of the location from the geographic information.

9. The method of claim 7, wherein the retrieving the information of the location from the data of wireless communications comprises:
monitoring wireless data usage by the user device in a predetermined time period via the first wireless service; and
determining the location in which an amount of the wireless data usage is greater than a predetermined value.

10. The method of claim 5, wherein the one or more QoS metrics comprise at least one of:
network coverage associated with the first wireless service and the second wireless service,
data transmission rates associated with the first wireless service and the second wireless service, or
signal strength associated with the first wireless service and the second wireless service.

11. The method of claim 5, further comprising:
generating, based on the comparison or the additional comparison, or a combination thereof, a recommendation for the second wireless service;
presenting the recommendation to a user associated with the user account; and
providing transferring information in response to a determination that the user accepts the recommendation.

12. The method of claim 11, wherein the transferring information comprises at least one of:
a coupon associated with the transferring;
information of one or more local stores associated with the second wireless service; or
a provisional account associated with the second wireless service for the user.

13. The method of claim 5, further comprising:
providing a survey to a user associated with the user account; and
receiving information of the location in response to the survey.

14. The method of claim 5, further comprising:
generating a graphical representation of the additional comparison or the comparison, or a combination thereof, the graphic representation indicating one or more comparisons on two overlaid coverage maps.

15. One or more non-transitory computer-readable media storing computer-executable instructions that, when executed on one or more processors, causes the one or more processors to perform acts comprising:
obtaining first service data from a first wireless service using a user account having a benefit of a user account access to the first wireless service;
obtaining second service data corresponding to the first service data from a second wireless service, the user account lacking a benefit of a user account access to the second wireless service; and
generating a comparison between the first wireless service and the second wireless service based on the first service data and the second service data.

16. The one or more non-transitory computer-readable media of claim 15, wherein the obtaining the first service data from the first wireless service using the user account comprises: transmitting an unstructured supplementary service data (USSD) message to a computing device associated with the first wireless service using the user account; receiving a return message in response to the USSD message from the computing device; and retrieving the first service data from the return message.

17. The one or more non-transitory computer-readable media of claim 15, wherein the acts further comprise:
determining one or more QoS metrics of the first wireless service and the second wireless service at one or more locations; and
generating an additional comparison between the first wireless service and the second wireless service based on the one or more QoS metrics.

18. The one or more non-transitory computer-readable media of claim 17, wherein the location indicates an area that a user associated with the user account visits in a predetermined time period.

19. The one or more non-transitory computer-readable media of claim 17, wherein the one or more QoS metrics comprise at least one of:
network coverage associated with the first wireless service and the second wireless service,
data transmission rates associated with the first wireless service and the second wireless service, or
signal strength associated with the first wireless service and the second wireless service.

20. The one or more non-transitory computer-readable media of claim 17, wherein the acts further comprise:
generating, based on the comparison or the additional comparison, or a combination thereof, a recommendation the second wireless service;
presenting the recommendation to a user associated with the user account; and
providing transferring information in response to a determination that the user accepts the recommendation.

21. A user device comprising: one or more processors; and memory to maintain a plurality of components executable by the one or more processors, the plurality of components comprising: an application configured to: transmit an unstructured supplementary service data (USSD) message to a computing device associated with a first wireless service using a user account having a benefit of a user account access to the first wireless service, receive a return message in response to the USSD message from the computing device, retrieve first service data from the return message, obtain second service data corresponding to the first service data from a second wireless service, the user account lacking a benefit of a user account access to the second wireless service, and generate a comparison between the first wireless service and the second wireless service based on the first service data and the second service data.

22. The user device of claim 21, wherein the application is configured to further:
determine one or more QoS metrics of the first wireless service and the second wireless service at a location; and
generate an additional comparison between the first wireless service and the second wireless service based on the one or more QoS metrics.

23. The user device of claim 22, wherein the application is configured to further:
provide a survey to a user associated with the user account;
receive return information corresponding to the survey; and
retrieve information of the location from the return information.

24. The user device of claim 23, wherein the retrieve information of the location from the return information comprises:
monitoring wireless data usage by the user device in a predetermined time period; and determining the location in which an amount of the wireless data usage is greater than a predetermined value.

25. The user device of claim 22, wherein the application is configured to further:
generate a graphical representation of the additional comparison or the comparison, or a combination thereof, the graphic representation indicating one or more comparisons on two overlaid coverage maps.

26. The user device of claim 22, wherein the application is configured to further:
provide a report based on the comparison.

27. The user device of claim 22, further comprising:
analyzing the user device using one or more predetermined parameters;
selecting an additional user device matching the user device; and
providing a recommendation of the additional user device to a user associated with the user account.

* * * * *